US012786370B2

(12) United States Patent
Ikeda

(10) Patent No.: US 12,786,370 B2
(45) Date of Patent: Nov. 3, 2026

(54) IMAGE GENERATION DEVICE, PROGRAM, IMAGE GENERATION METHOD, AND IMAGE DISPLAYING SYSTEM

(71) Applicant: SONY INTERACTIVE ENTERTAINMENT INC., Tokyo (JP)

(72) Inventor: Takakazu Ikeda, Tokyo (JP)

(73) Assignee: Sony Interactive Entertainment Inc., Tokyo (JP)

( * ) Notice: Subject to any disclaimer, the term of this patent is extended or adjusted under 35 U.S.C. 154(b) by 191 days.

(21) Appl. No.: 18/548,225

(22) PCT Filed: Dec. 22, 2021

(86) PCT No.: PCT/JP2021/047574
§ 371 (c)(1),
(2) Date: Aug. 29, 2023

(87) PCT Pub. No.: WO2022/190572
PCT Pub. Date: Sep. 15, 2022

(65) Prior Publication Data

US 2024/0137482 A1 Apr. 25, 2024
US 2024/0236290 A9 Jul. 11, 2024

(30) Foreign Application Priority Data

Mar. 9, 2021 (JP) ................................ 2021-037685

(51) Int. Cl.
*H04N 13/344* (2018.01)
*H04N 13/111* (2018.01)
*H04N 13/194* (2018.01)

(52) U.S. Cl.
CPC ......... *H04N 13/344* (2018.05); *H04N 13/111* (2018.05); *H04N 13/194* (2018.05)

(58) Field of Classification Search
CPC ......... H04N 13/344; G09G 5/00; G09G 5/377
See application file for complete search history.

(56) References Cited

U.S. PATENT DOCUMENTS 11,037,359 B1 * 6/2021 Bleyer ................. H04N 13/128
2006/0139371 A1 * 6/2006 Lavine ...................... G06F 3/14
345/620

(Continued)

FOREIGN PATENT DOCUMENTS

JP 2010057069 A 3/2010
JP 2019106628 A 6/2019

(Continued)

OTHER PUBLICATIONS

Office Action of Nov. 19, 2024 for corresponding JP Patent Application No. 2021-037685 with English translation, pp. 1-4.

(Continued)

*Primary Examiner* — Grace Q Li
(74) *Attorney, Agent, or Firm* — Kilpatrick Townsend & Stockton LLP

(57) ABSTRACT

An image generation device 200 includes a source image generation unit 203 that generates a source image to which no distortion is provided, an HMD image generation unit 204*a* that generates an HMD image to be displayed on a head-mounted display, in reference to the source image, and a mirroring image generation unit 204*b* that generates a mirroring image for mirroring of the HMD image on a flat plate type display, in reference to the source image.

20 Claims, 7 Drawing Sheets

(56) References Cited

U.S. PATENT DOCUMENTS

| | | | | |
|---|---|---|---|---|
| 2013/0241955 | A1* | 9/2013 | Tamaru | H04N 13/344 345/633 |
| 2015/0067549 | A1* | 3/2015 | Chang | G06F 3/0488 715/761 |
| 2015/0312561 | A1* | 10/2015 | Hoof | H04N 21/41407 348/46 |
| 2019/0215486 | A1* | 7/2019 | Venshtain | G06T 17/20 |

FOREIGN PATENT DOCUMENTS

| | | | |
|---|---|---|---|
| JP | 2020036166 | A | 3/2020 |
| JP | 2020052143 | A | 4/2020 |
| JP | 2021015156 | A | 2/2021 |
| WO | 2011045872 | A1 | 4/2011 |

OTHER PUBLICATIONS

International Search Report for corresponding international application No. PCT/JP2021/047574, dated Mar. 15, 2022, pp. 1-4.

* cited by examiner

IMAGE GENERATION DEVICE, PROGRAM, IMAGE GENERATION METHOD, AND IMAGE DISPLAYING SYSTEM

TECHNICAL FIELD

The present invention relates to an image generation technology.

BACKGROUND ART

It is often the case that a user wears a head-mounted display connected to a game machine on the head and operates, while looking at a screen displayed on the head-mounted display, a controller or the like to play a game. If the user wears the head-mounted display, then the user looks only at a screen image displayed on the head-mounted display, and therefore, there is an effect that the feeling of immersion of the user in the screen image world increases and the entertainment performance of the game further enhances. Further, if a screen image of virtual reality (VR (Virtual Reality)) is displayed on the head-mounted display and the head-mounted display displays the all-around virtual space over 360 degrees when the user wearing the head-mounted display turns the head, then the feeling of immersion in the screen image is further enhanced and also the operability of an application such as a game is improved.

On the other hand, in recent years, mirroring for sharing a screen displayed on a head-mounted display with a different display device has been proposed. Mirroring is a technology for transmitting image data as information concerning a screen being displayed on a transmission device to a reception device through a network to share the displayed screen between the transmission device and the reception device.

SUMMARY

Technical Problem

A new system for providing an image with use of a head-mounted display has been and is being developed. In association with this, a mirroring technology for providing a mirroring image of high quality in this new system is demanded.

Taking this into consideration, it is an object of the present invention to provide a mirroring technology for providing a mirroring image of high quality in a new system for providing an image with use of a head-mounted display.

Solution to Problem

In order to solve the problem described above, the image generation device of a certain mode of the present invention includes a source image generation unit that generates a source image to which no distortion is provided, an HMD image generation unit that generates an HMD image to be displayed on a head-mounted display, in reference to the source image, and a mirroring image generation unit that generates a mirroring image for mirroring of the HMD image on a flat plate type display, in reference to the source image.

The program of the certain mode of the present invention causes a processor to function as a source image generation unit that generates a source image to which no distortion is provided, an HMD image generation unit that generates an HMD image to be displayed on a head-mounted display, in reference to the source image, and a mirroring image generation unit that generates a mirroring image for mirroring of the HMD image on a flat plate type display, in reference to the source image.

The image generation method of the certain mode of the present invention includes a step of generating a source image to which no distortion is provided, and a step of generating, in reference to the source image, an HMD image to be displayed on a head-mounted display and a mirroring image for mirroring of the HMD image on a flat plate type display.

The image display system of the certain mode of the present invention includes an image generation device including a source image generation unit that generates a source image to which no distortion is provided, an HMD image generation unit that generates an HMD image to be displayed on a head-mounted display, in reference to the source image, a mirroring image generation unit that generates a mirroring image for mirroring of the HMD image on a flat plate type display, in reference to the source image, an HMD image supplying unit that supplies the HMD image to the head-mounted display, and a mirroring image supplying unit that supplies the mirroring image to the flat plate type display, the head-mounted display that displays the HMD image supplied thereto, and the flat plate type display that displays the mirroring image supplied thereto.

It is to be noted that also any combination of the components described above and constituent elements and representations of the present invention where they are converted between a method, an apparatus, a program, a transitory or non-transitory recording medium in which the program is recorded, a system, and so forth are effective as modes of the present invention.

Advantageous Effects of Invention

According to the present invention, it is possible to provide a mirroring technology for providing a mirroring image of high quality in a new system for providing an image with use of a head-mounted display.

DESCRIPTION OF EMBODIMENT

Embodiment

Figure 1:
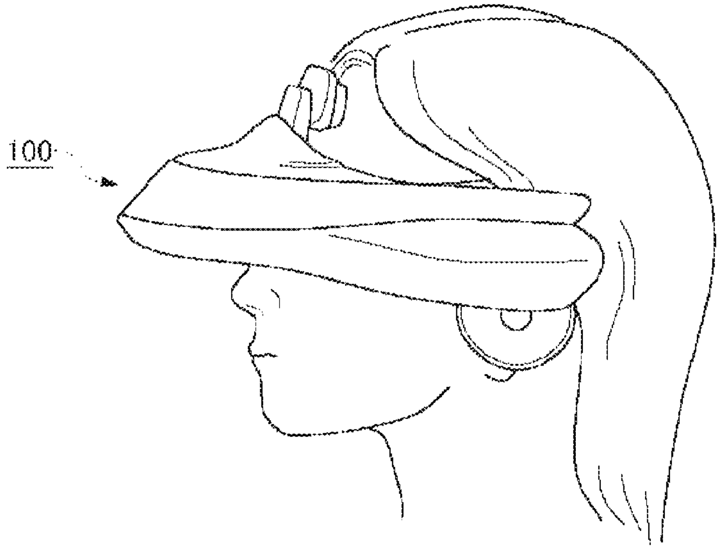
FIG. 1 is an appearance view of a head-mounted display.

FIG. 1 is an appearance view of a head-mounted display 100. The head-mounted display 100 is a display device for allowing a user, who wears the display device on the head, to appreciate a still picture, a dynamic picture, and so forth displayed on the display and listen to sound, music, or the like outputted from a headphone.

Position information concerning the head of a user who is wearing the head-mounted display 100 and posture (orientation) information such as a turning angle and an inclination of the head can be measured by a gyro sensor, an acceleration sensor, and so forth built in or externally attached to the head-mounted display 100.

The head-mounted display 100 may further include a camera for capturing an image of the eyes of the user. By the camera incorporated in the head-mounted display 100, the gaze direction of the user, a movement of the pupil, a blink, and so forth can be detected.

The head-mounted display 100 is an example of a "wearable display." Here, a generation method of an image to be displayed on the head-mounted display 100 is described. It is to be noted that the image generation method of the present embodiment can not only be applied to the head-mounted display 100 in the narrow sense but can also be applied to a case in which an eyeglass, an eyeglass type display, an eyeglass type camera, a headphone, a headset (headphone with a microphone), an earphone, an earring, an ear hook camera, a hat, a hat with a camera, a hair band, or the like is mounted.

Figure 2:
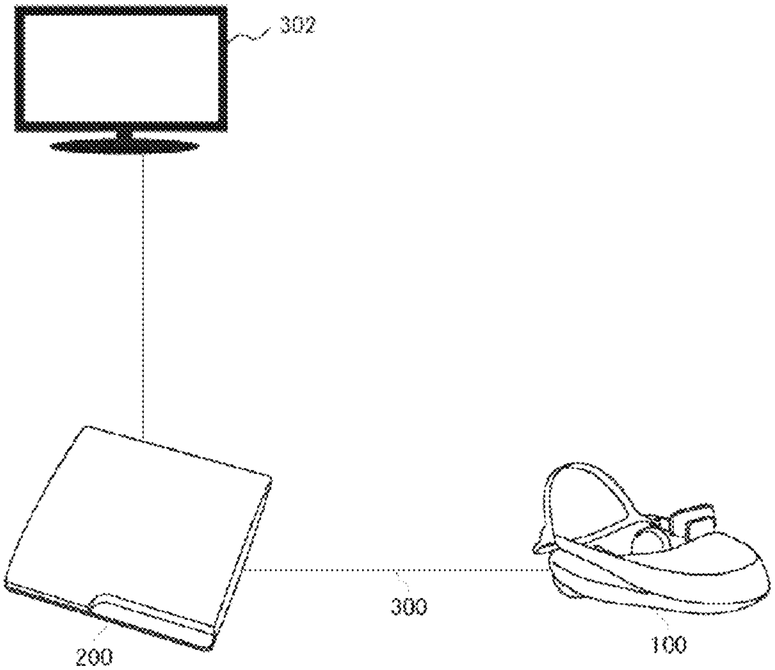
FIG. 2 is a schematic diagram of an image generation system.

FIG. 2 is a schematic diagram of an image transfer system according to the present embodiment. The head-mounted display 100 is connected to a rendering apparatus 200 through an interface of, as an example, HDMI (registered trademark) (High-Definition Multimedia Interface) that is a standard specification for a communication interface for transmitting video and audio in a digital signal, DisplayPort that is a standard for a video output interface, or the like. A flat plate type display 302 is connected to the rendering apparatus 200. The rendering apparatus 200 in the present embodiment is an example of the image generation device.

In the present embodiment, a data transmission line 300 between the head-mounted display 100 and the rendering apparatus 200 is an HDMI transmission line or a DisplayPort transmission line. In the HDMI standard or the DisplayPort standard, it is possible to transmit a secondary data packet in association with an image frame, and it is possible to include metadata relating to the frame into the secondary data packet. In the HDMI 2.1 standard, a function called dynamic HDR (High Dynamic Range) is available, and it is possible to generate a video that is adjusted optimally in terms of the luminance and the color depth for each frame according to a scene by referring to dynamic metadata (Dynamic Metadata) of the video. In the HDMI 2.1 standard, dynamic metadata can be transmitted in synchronization with the video in terms of information necessary for the dynamic HDR such as a maximum luminance, an average luminance, and a minimum luminance of a scene. The communication interface between the head-mounted display 100 and the rendering apparatus 200 is not limited to HDMI or DisplayPort if it can transmit the metadata in synchronism with the video.

The rendering apparatus 200 in the present embodiment is a game machine. The rendering apparatus 200 may be further connected to a server via a network. In this case, the server may provide to the rendering apparatus 200 an online application of a game or the like in which a plurality of users can participate via the network.

The rendering apparatus 200 basically processes a program of content to generate a display image and transmits the display image to the head-mounted display 100 and the flat plate type display 302. The program and the data of the content are read out by a medium drive (not depicted) from a ROM (Read Only Memory) medium (not depicted) in which application software of content of a game or the like and license information are recorded. This ROM medium is a read-only recording medium such as an optical disk, a magneto-optical disk, or a blue ray disk. In a certain mode, the rendering apparatus 200 specifies a position of a point of view and a direction of a line of sight in reference to a position and a posture of the head of the user who is wearing the head-mounted display 100 and generates a display image of the content at a predetermined rate such that a field of view according to the position of the point of view and the direction of the line of sight is obtained.

The head-mounted display 100 receives data concerning the display image and displays the data as an image of the content. The screen image that is displayed on the head-mounted display 100 may be a screen image captured by the camera in advance, a screen image created by computer graphics as exemplified by a game screen image, or a live screen image at a remote location distributed via the network. Further, the image displayed on the head-mounted display 100 may be a VR image, an AR (Augmented Reality) image, an MR (Mixed Reality) image, or the like.

The flat plate type display 302 may be a television set that includes a display that outputs an image and a speaker that outputs sound, and may particularly be any of a liquid crystal television set, an organic EL (Electroluminescence) television set, a plasma television set, a PC (Personal Computer) display, and so forth. Alternatively, the flat plate type display 302 may be a display and a speaker of a tablet terminal or a portable terminal.

Here, a supposed technique of a mirroring technology for sharing an image displayed on the head-mounted display 100 by displaying the image on the flat plate type display 302 is described with reference to a comparative example of FIG. 9. The mirroring system of FIG. 9 includes a rendering apparatus 400, a head-mounted display 100, a flat plate type display 302, and an output controlling apparatus 500. The output controlling apparatus 500 is provided separately from the rendering apparatus 400 and connected to the rendering apparatus 400. The output controlling apparatus 500 processes data outputted from the rendering apparatus 400. The output controlling apparatus 500 relays the processed data to the head-mounted display 100 and the flat plate type display 302 through an output port 500*a* for a head-mounted display and an output port 500*b* for a mirroring image, respectively.

Figure 9:
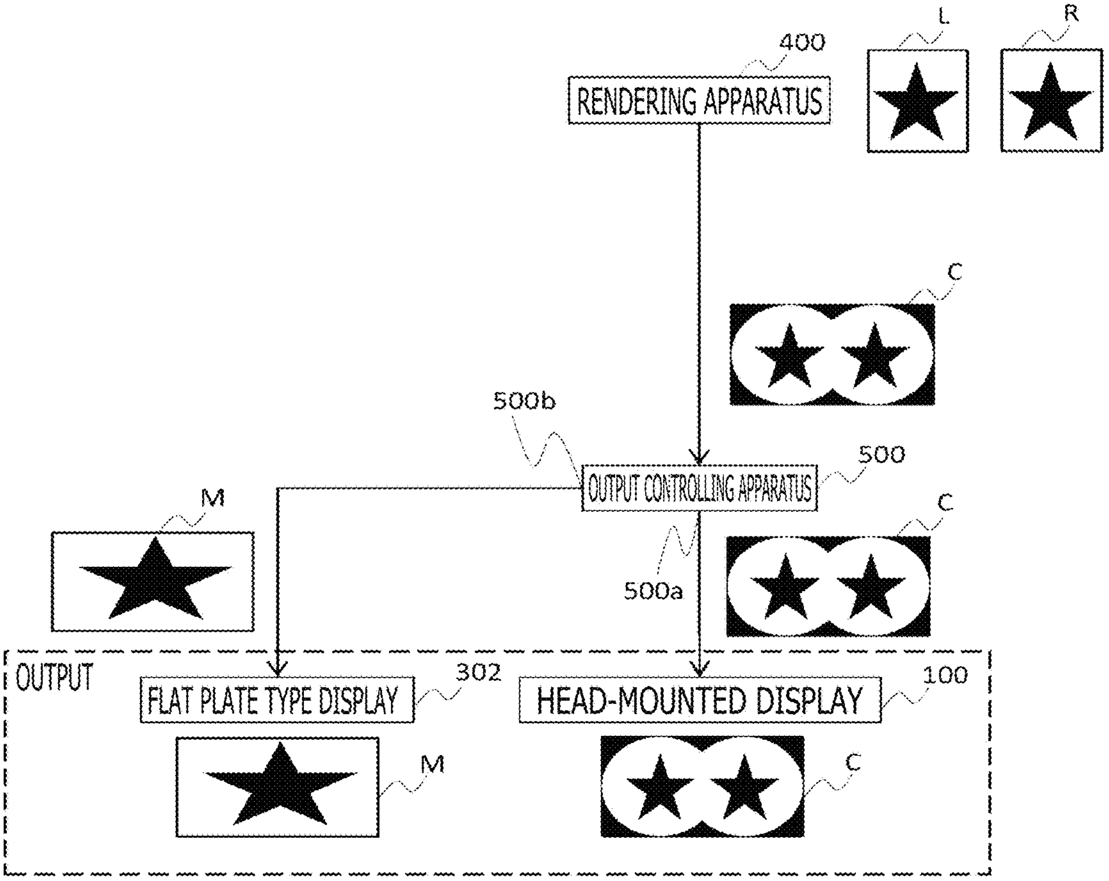
FIG. 9 is a view illustrating a mirroring system of a comparative example.

In the mirroring system of FIG. 9, the rendering apparatus 400 first generates an image L for the left eye and an image R for the right eye as a source image relating to content. The rendering apparatus 400 performs distortion correction corresponding to distortion by the eyepieces of the head-mounted display 100 for the image L for the left eye and the image R for the right eye to generate a binocular image C for the head-mounted display 100. The binocular image C is supposed to achieve stereoscopic vision of an image and is configured such that a pair of parallax images including the image L for the left eye and the image R for the right eye are disposed in left and right regions obtained by dividing an image plane corresponding to the display panel into two. Here, the head-mounted display 100 has a configuration in which an optical lens of a high curvature for displaying a screen image of a wide angular viewing field in front of the eyes of and around the user is adopted and the user looks into the display panel through the lenses. If a lens of a high curvature is used, then the screen image is distorted by distortion aberration of the lens. As such, a distortion process is performed in advance for a rendered image such that, when the image is viewed through the lens having a high curvature, the image looks correctly, and the image obtained after the distortion process is transmitted to the head-mounted display and displayed on the display panel such that, when the user looks at the image through the lens having a high curvature, the image looks normal. The rendering apparatus 400 supplies this binocular image C to the output controlling apparatus 500.

The output controlling apparatus 500 supplies the binocular image C as it is as a head-mounted display image (hereinafter referred to as an HMD image) C to the head-mounted display 100 via the output port 500*a* for an HMD image. Further, the output controlling apparatus 500 performs correction reverse to the distortion correction described above for the image of one of the portion for the left eye and the portion for the right eye of the binocular image C, and cuts a central portion of the image for which the correction just described is performed, to generate a mirroring image M for the flat plate type display 302. The output controlling apparatus 500 supplies this mirroring image M to the flat plate type display 302 through the output port 500*b* for a mirroring image. In this manner, the HMD image C is displayed on the head-mounted display 100, and the mirroring image M is displayed on the flat plate type display 302, so that mirroring is implemented by the mirroring system of FIG. 9. However, in the mirroring system of FIG. 9, since it is necessary to perform correction reverse to distortion correction, there is a problem that the mirroring image M is degraded.

Figure 3:
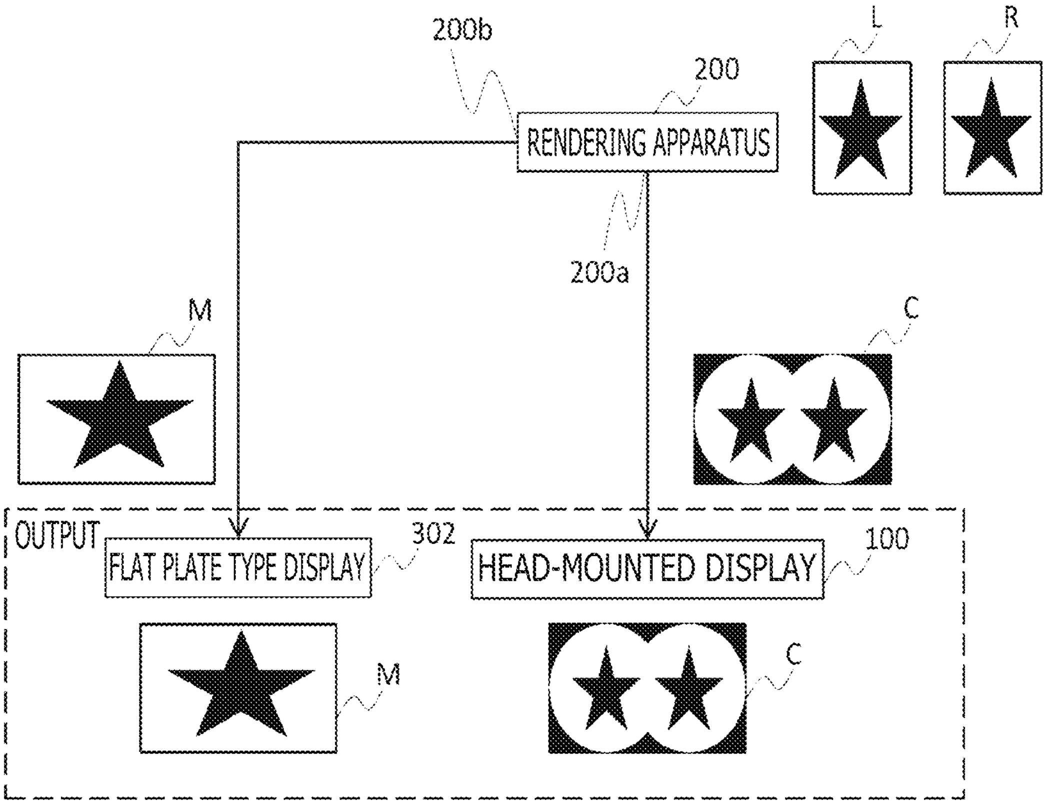
FIG. 3 is a view illustrating a mirroring system of an embodiment.

Meanwhile, a new mirroring system of FIG. 3 has been developed. The mirroring system of FIG. 3 includes a rendering apparatus 200, a head-mounted display 100, and a flat plate type display 302. In the system of FIG. 3, unlike the system of FIG. 9, the output controlling apparatus 500 is not provided between the rendering apparatus 400, the head-mounted display 100, and flat plate type display 302. In the system of FIG. 3, the functions for generating a source image, performing a necessary process for the source image to generate an HMD image and a mirroring image, and supplying the HMD image and the mirroring image to the head-mounted display 100 and the flat plate type display 302, respectively, are implemented in the same apparatus.

An outline of the mirroring technique in the system of FIG. 3 is described. The rendering apparatus 200 generates an image L for the left eye and an image R for the right eye as a source image relating to content. The rendering apparatus 200 performs, in reference to the source image, distortion correction corresponding to distortion by the eyepieces of the head-mounted display 100 and a projection process and so forth based on the latest position information and posture information of the head-mounted display 100 for the image L for the left eye and the image R for the right eye to generate a binocular image C. The rendering apparatus 200 supplies the generated binocular image C as an HMD image to the head-mounted display 100 through an HMD image output port 200*a*.

Further, the rendering apparatus 200 performs, in reference to a source image, a process hereinafter described for one of the image L for the left eye and the image R for the right eye (in the present embodiment, for the image R for the right eye) to generate a mirroring image M. The rendering apparatus 200 supplies the generated mirroring image M to the flat plate type display 302 through a mirroring image output port 200*b*. In this manner, the HMD image C is displayed on the head-mounted display 100, and the mirroring image M is displayed on the flat plate type display 302, so that mirroring is implemented by the mirroring system of FIG. 3.

According to the present embodiment, a source image is distortion-corrected to generate a mirroring image M, and such correction reverse to distortion correction as described in the mirroring system of FIG. 9 is not performed. Thus, it is possible to reduce degradation of the mirroring image M. As a result, it is possible to provide a mirroring image of high quality. In the following, the mirroring technique of the present embodiment is described in detail.

Figure 4:
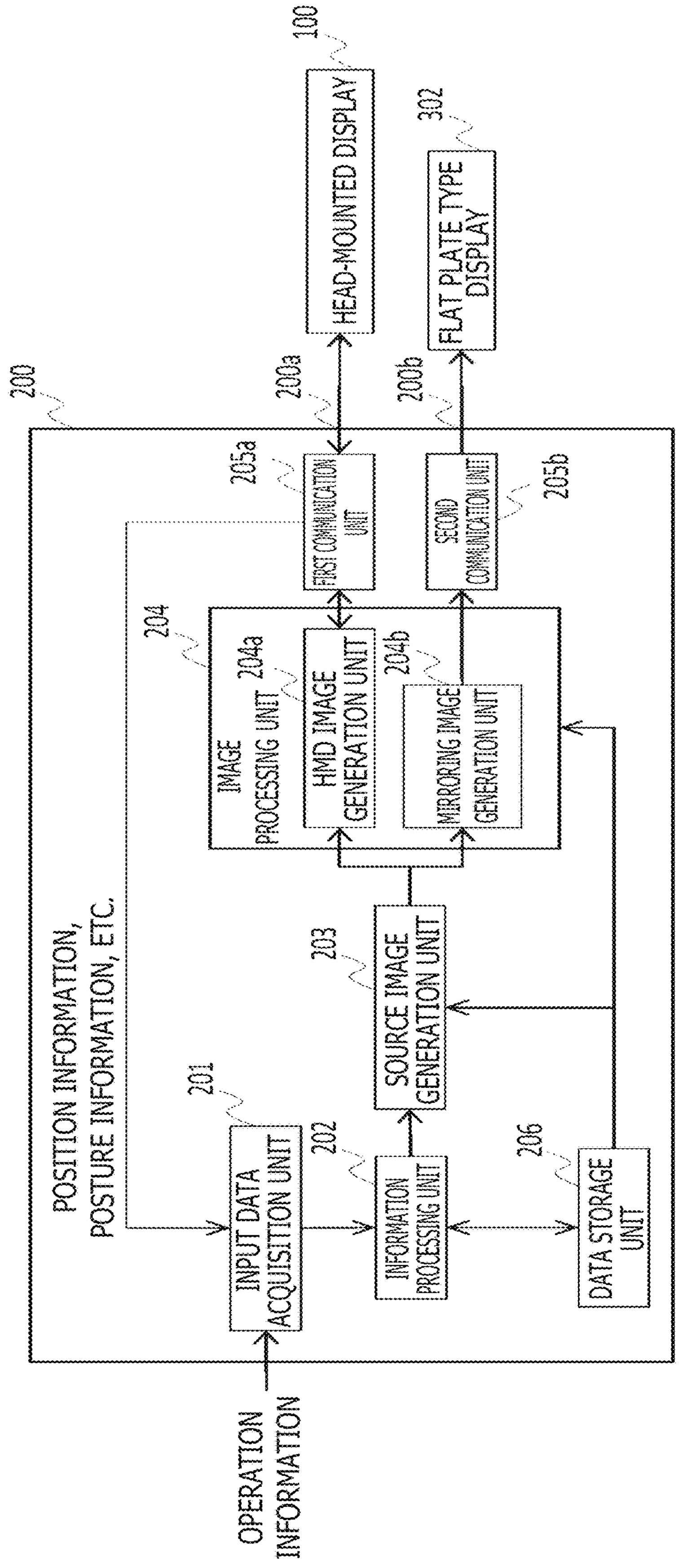
FIG. 4 is a block diagram of a rendering device of FIG. 2.

FIG. 4 is a block diagram of the rendering apparatus 200 of FIG. 2. The rendering apparatus 200 includes an input data acquisition unit 201, an information processing unit 202, a source image generation unit 203, a source image processing unit 204, first and second communication units 205*a* and 205*b*, and a data storage unit 206 for storing data necessary for generation of an image. FIG. 4 depicts a block diagram that focuses on functions, and the functions can be implemented in various forms only from hardware, only from software or a combination of the two.

The first and second communication units 205*a* and 205*b* establish communication by a predetermined protocol such as HDMI (registered trademark) or USB (Universal Serial Bus). The first communication unit 205*a* is configured for communication with the head-mounted display 100 through the HMD image output port 200*a*. The first communication unit 205*a* receives position information and posture information of the head-mounted display 100 from the head-mounted display 100. The first communication unit 205*a* is configured for supplying an HMD image C to the head-mounted display 100. The first communication unit 205*a* in the present embodiment is an example of an HMD image supplying unit. The second communication unit 205*b* is configured for communication with the flat plate type display 302 through the output port 500*b* for a mirroring image. The second communication unit 205*b* is configured for supplying a mirroring image M to the flat plate type display 302. The second communication unit 205*b* in the present embodiment is an example of a mirroring image supplying unit.

The input data acquisition unit 201 acquires input data. The input data includes operation information indicative of the substance of a user operation inputted through an inputting device (not depicted), position information and posture information concerning the head of the user acquired through the first communication unit 205*a*, and so forth. Here, the user operation may be an operation performed in general information processing such as selection of an application to be executed, start/end of processing or command inputting. The input data acquisition unit 201 supplies the acquired input data to the information processing unit 202.

The information processing unit 202 performs information processing according to an application to be executed such as a game. For example, the information processing unit 202 progresses a game or carries out a corresponding process according to the input data. The information processing unit 202 supplies a result of the information process to the source image generation unit 203.

The source image generation unit 203 reads out, according to a result of the information process, necessary data from the data storage unit 206 to generate a source image such as a game image to be outputted. For example, the source image generation unit 203 generates an image L for the left eye and an image R for the right eye relating to a virtual world as viewed from a point of view corresponding to the position and the posture of the head of the user as a source image. The source image generation unit 203 generates a source image to which no distortion is provided, in this manner. The source image generation unit 203 supplies the source image to the image processing unit 204.

The image processing unit 204 performs processing according to the necessity for the source image, to generate an HMD image C and a mirroring image M. The source image processing unit 204 includes an HMD image generation unit 204*a* that generates an HMD image C and a mirroring image generation unit 204*b* that generates a mirroring image M.

The HMD image generation unit 204*a* draws, as left and right parallax images, an image L for the left eye and an image R for the right eye as a source image and then performs a necessary process for the left and right parallax images to generate a binocular image C in which the image L for the left eye and the image R for the right eye are disposed on the left and the right, respectively. As the necessary process, general processes can be applied including distortion correction with the lens taken into consideration, a reprojection process based on the latest position information and posture information of the head-mounted display 100, a superposition process of a menu screen, and so forth. The HMD image generation unit 204*a* supplies the generated binocular image C as an HMD image C to the head-mounted display 100 through the first communication unit 205*a*.

The mirroring image generation unit 204*b* generates a mirroring image M by using a portion (for example, a central portion) of one of the image L for the left eye and the image R for the right eye (in the present embodiment, the image R for the right eye) as a source image. The mirroring image generation unit 204*b* supplies the mirroring image M to the flat plate type display 302 through the second communication unit 205*b*. In the following, a generation technique of a mirroring image by the mirroring image generation unit 204*b* is described.

First, a case in which a mirroring image M in a three-dimensional display mode is generated is described. The mirroring image generation unit 204*b* calculates a viewing angle (UV coordinate values) of the head-mounted display 100 relating to an HMD image C on which a reprojection process by the HMD image generation unit 204*a* is reflected. The UV coordinate values are parameter coordinates for referring to a texture attribute. The mirroring image generation unit 204*b* refers to a texture corresponding to the viewing angle by using the calculated UV coordinate values, to generate a plurality of texture images corresponding to the portion of the image R for the right eye. The mirroring image generation unit 204*b* generates a mirroring image M of a three-dimensional display mode by superimposing the plurality of texture images. By using a viewing angle same as the viewing angle in the binocular image C obtained after the process performed by the HMD image generation unit 204*a* in this manner, it is possible to generate a mirroring image M that matches with the field of view of the HMD image C obtained after the reprojection process. Accordingly, it is possible to provide a mirroring image M of a three-dimensional display mode of high quality on which the influence of tracking of the head-mounted display 100 is reduced. Further, it is possible to adjust the horizontal width of displaying of the flat plate type display 302 by using the viewing angle of the head-mounted display 100 in the binocular image C after the process and select a texture. Furthermore, it is possible to cause the image quality to depend upon the texture of the source image.

Figure 5A:
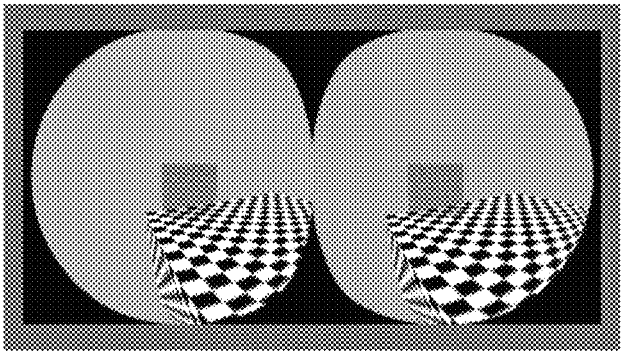
FIG. 5A depicts an example of an image for a head-mounted display in three-dimensional displaying.
Figure 5B:
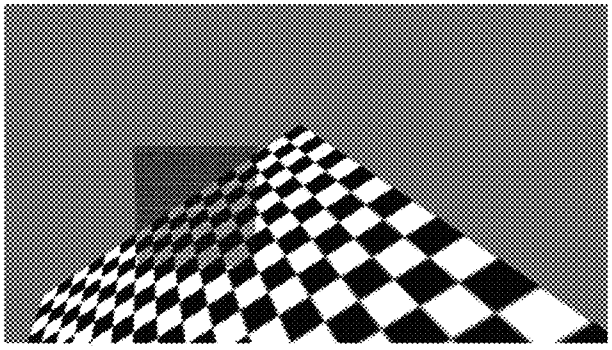
FIG. 5B depicts an example of a mirroring image in dimensional displaying.
Figure 6A:
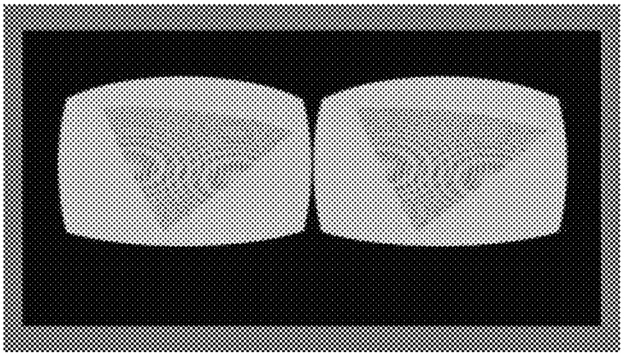
FIG. 6A depicts an example of an image for a head-mounted display in two-dimensional displaying.
Figure 6B:
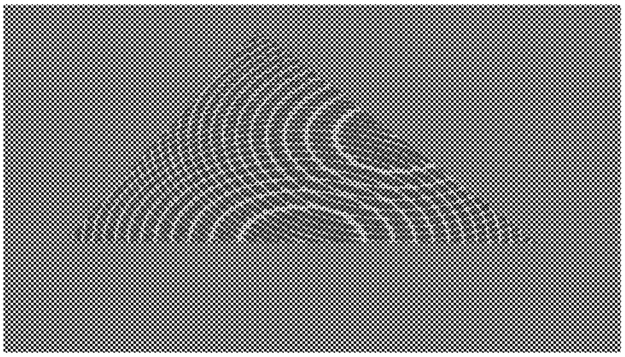
FIG. 6B depicts an example of a mirroring image in two-dimensional displaying.
Figure 7:
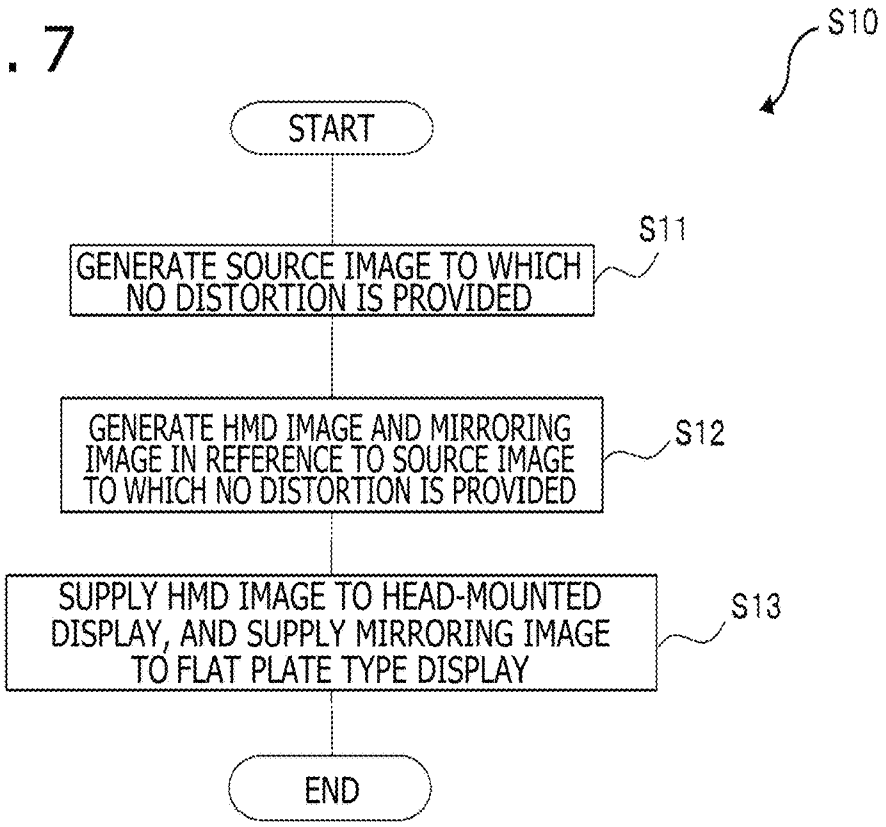
FIG. 7 is a flow chart depicting a flow of processing in the rendering device.

Now, a case in which a mirroring image M of a two-dimensional display mode is described. The mirroring image generation unit 204*b* pastes a portion of the image R for the right eye as a texture to a panel of 16:9 (virtual screen) corresponding to the screen size of the flat plate type display 302 to generate a mirroring image M of a two-dimensional display mode. Consequently, the portion of the image R for the right eye is displayed as it is, irrespective of tracking of the head-mounted display 100 (movement of the head). Accordingly, it is possible to provide a mirroring image M of a two-dimensional display mode of high quality on which the influence of the tracking of the head-mounted display 100 is reduced. Here, the mirroring image M of a two-dimensional display mode is used when a screen image of a two-dimensional plane is to be projected in a virtual space, and for example, when a virtual image screen is to be displayed in a virtual space, the mirroring image M of a two-dimensional display mode is used.

Where an HMD image and a mirroring image are supplied to the head-mounted display 100 and the flat plate type display 302 in this manner, respectively, the images are displayed as they are on the head-mounted display 100 and the flat plate type display 302, respectively. FIGS. 5A and 5B depict an example of an HMD image C and a mirroring image M in three-dimensional displaying. FIGS. 6A and 6B depict an example of an HMD image C and a mirroring image M in two-dimensional displaying.

In the following, a process S10 for causing an HMD image C and a mirroring image M in the present embodiment to be displayed on the head-mounted display 100 and the flat plate type display 302, respectively, is described. In step S11, the source image generation unit 203 generates a source image to which no distortion is provided. In step S12, the image processing unit 204 generates an HMD image C and a mirroring image M in reference to the source image. In step S13, the first communication unit 205*a* supplies the HMD image C to the head-mounted display 100, and the second communication unit 205*b* supplies the mirroring image M to the flat plate type display 302. After S13, the process S10 ends.

(Modification)

In the following, a modification of the embodiment is described.

Figure 8:
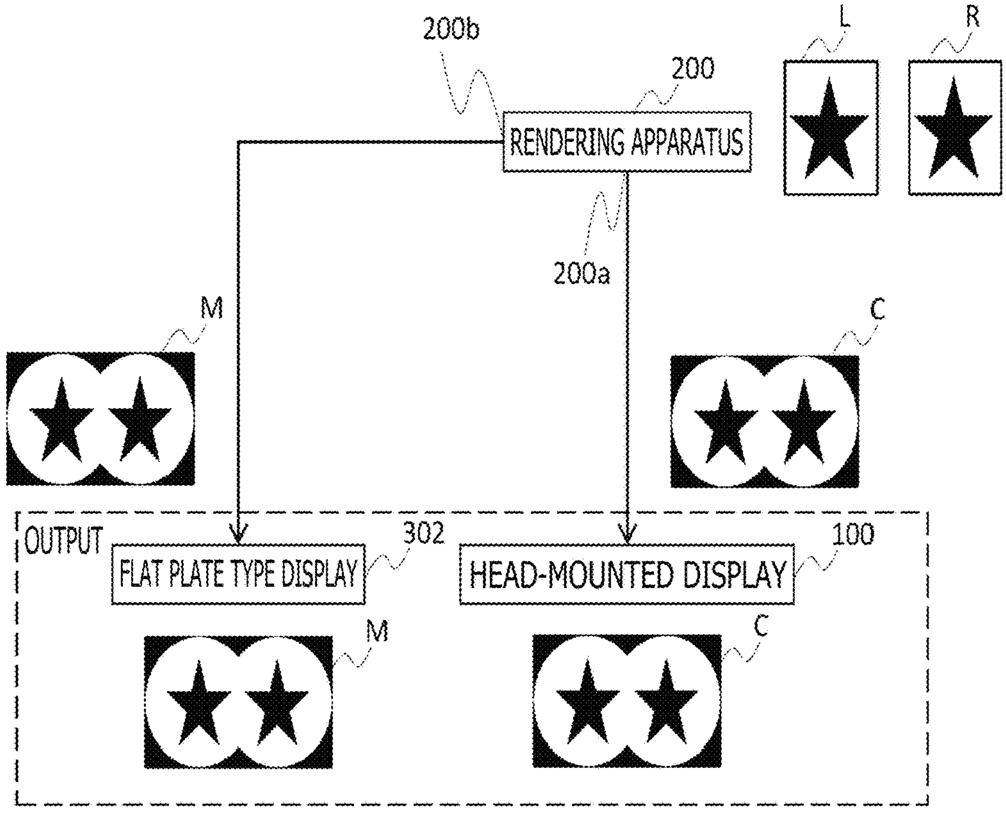
FIG. 8 is a view illustrating a mirroring system of a modification.

Although, in the embodiment, the mirroring image M is generated with use of a portion of the image R for the right eye, this is not restrictive. For example, the mirroring image M may otherwise be an image equivalent to the binocular image C generated by the HMD image generation unit 204*a* (refer to FIG. 8). In this case, the mirroring image generation unit 204*b* may perform a process similar to that performed by the HMD image generation unit 204*a*, to generate a binocular image C, and supply the binocular image C as a mirroring image M to the flat plate type display 302. According to the present configuration, since the HMD image C (binocular image C) supplied to the head-mounted display 100 can be checked on the flat plate type display 302, it is facilitated for a developer to perform debugging.

Although, in the present embodiment, the rendering apparatus 200 is a game machine, this is not restrictive. The rendering apparatus 200 may further be a server or the like connected to the head-mounted display 100 and the flat plate type display 302 through a network.

The present invention has been described in connection with the embodiment. The embodiment is exemplary, and it can be recognized by those skilled in the art that various modifications can be made in combinations of the components and the processes of the embodiment and that also such modifications fall within the scope of the present invention. Such modifications are described.

INDUSTRIAL APPLICABILITY

The present invention relates to an image generation technology.

REFERENCE SIGNS LIST

100: Head-mounted display
200: Rendering apparatus
200*a*: HMD image output port
200*b*: Mirroring image output port 200*b*
201: Input data acquisition unit
202: Information processing unit
203: Source image generation unit
204: Source image processing unit
204*a*: HMD image generation unit
204*b*: Mirroring image generation unit
205: Communication unit
206: Data storage unit
300: Data transmission line
302: Flat plate type display

The invention claimed is:

1. An image generation device comprising:

a circuitry configured to:

generate a source image to which no distortion is provided;

generate a head-mounted display image to be displayed on a head-mounted display, in reference to the source image, wherein the source image includes an image for the right eye and an image for the left eye of the head-mounted display, and wherein the head-mounted display image is generated by performing a reprojection process for a portion of one of the image for the right eye and the image for the left eye;

generate a mirroring image for mirroring of the head-mounted display image on a flat plate type display, in reference to the source image and without reference to the head-mounted display image, wherein the mirroring image is generated by using the portion of the image and referring to a texture corresponding to a viewing angle of the head-mounted display relating to the head-mounted display image on which the reprojection process is reflected; and adjust a horizontal width of the mirroring image displayed on the flat plate type display based on the viewing angle of the head-mounted display image after the reprojection process.

2. The image generation device according to claim 1, wherein the mirroring image is generated in a three-dimensional display mode.

3. The image generation device according to claim 2, wherein the mirroring image of the three-dimensional display mode is generated by:

generating a plurality of texture images corresponding to the portion of the one of the image for the right eye and the image for the left eye; and superimposing the plurality of texture images.

4. The image generation device according to claim 1, wherein the mirroring image of a two-dimensional display mode is generated by pasting the portion of the one of the images to a panel corresponding to a screen size of the flat plate type display.

5. The image generation device according to claim 1, wherein the circuitry is further configured to transmit, in synchronism with the mirroring image, metadata associated with the source image to the flat plate type display.

6. A non-transitory recording medium storing instructions which, when executed by a processor, cause the processor to perform processing, comprising:

generating a source image to which no distortion is provided;

generating a head-mounted display image to be displayed on a head-mounted display, in reference to the source image, wherein the source image includes an image for the right eye and an image for the left eye of the head-mounted display, and wherein the head-mounted display image is generated by performing a reprojection process for a portion of one of the image for the right eye and the image for the left eye;

generating a mirroring image for mirroring of the head-mounted display image on a flat plate type display, in reference to the source image and without reference to the head-mounted display image, wherein the mirroring image is generated by using the portion of the image and referring to a texture corresponding to a viewing angle of the head-mounted display relating to the head-mounted display image on which the reprojection process is reflected; and adjust a horizontal width of the mirroring image displayed on the flat plate type display based on the viewing angle of the head-mounted display image after the reprojection process.

7. The non-transitory recording medium according to claim 6, wherein the mirroring image is generated in a three-dimensional display mode.

8. The non-transitory recording medium according to claim 7, wherein the mirroring image of the three-dimensional display mode is generated by:

generating a plurality of texture images corresponding to the portion of the one of the image for the right eye and the image for the left eye; and superimposing the plurality of texture images.

9. The non-transitory recording medium according to claim 6, wherein the mirroring image of a two-dimensional display mode is generated by pasting the portion of the one of the images to a panel corresponding to a screen size of the flat plate type display.

10. The non-transitory recording medium according to claim 6, wherein the processing further comprising transmitting, in synchronism with the mirroring image, metadata associated with the source image to the flat plate type display.

11. An image generation method comprising:

generating a source image to which no distortion is provided;

generating, in reference to the source image, a head-mounted display image to be displayed on a head-mounted display and a mirroring image for mirroring of the head-mounted display image on a flat plate type display, wherein the source image includes an image for the right eye and an image for the left eye of the head-mounted display, and wherein the head-mounted display image is generated by performing a reprojection process for a portion of one of the image for the right eye and the image for the left eye, wherein mirroring image is generated without reference to the head-mounted display image, wherein the mirroring image is generated by using the portion of the image and referring to a texture corresponding to a viewing angle of the head-mounted display relating to the head-mounted display image on which the reprojection process is reflected; and adjust a horizontal width of the mirroring image displayed on the flat plate type display based on the viewing angle of the head-mounted display image after the reprojection process.

12. The image generation method according to claim 11, wherein the mirroring image is generated in a three-dimensional display mode.

13. The image generation method according to according to claim 12, wherein the mirroring image of the three-dimensional display mode is generated by:

generating a plurality of texture images corresponding to the portion of the one of the image for the right eye and the image for the left eye; and superimposing the plurality of texture images.

14. The image generation method according to claim 11, wherein the mirroring image of a two-dimensional display mode is generated by pasting the portion of the one of the images to a panel corresponding to a screen size of the flat plate type display.

15. The image generation method according to according to claim 11, further comprising transmitting, in synchronism with the mirroring image, metadata associated with the source image to the flat plate type display.

16. An image display system comprising:

an image generation device including a circuitry configured to:

generate a source image to which no distortion is provided, generate a head-mounted display image to be displayed on a head-mounted display, in reference to the source image, wherein the source image includes an image for the right eye and an image for the left eye of the head-mounted display, and wherein the head-mounted display image is generated by performing a reprojection process for a portion of one of the image for the right eye and the image for the left eye, generate a mirroring image for mirroring of the head-mounted display image on a flat plate type display, in reference to the source image and without reference to the head-mounted display image, wherein the mirroring image is generated by using the portion of the image and referring to a texture corresponding to a viewing angle of the head-mounted display relating to the head-mounted display image on which the reprojection process is reflected, adjust a horizontal width of the mirroring image displayed on the flat plate type display based on the viewing angle of the head-mounted display image after the reprojection process, supply the head-mounted display image to the head-mounted display, and supply the adjusted mirroring image to the flat plate type display;

the head-mounted display that displays the head-mounted display image supplied thereto; and the flat plate type display that displays the adjusted mirroring image supplied thereto.

17. The image display system according to claim 16, wherein the mirroring image is generated in a three-dimensional display mode.

18. The image display system according to claim 17, wherein the mirroring image of the three-dimensional display mode is generated by:

generating a plurality of texture images corresponding to the portion of the one of the image for the right eye and the image for the left eye; and superimposing the plurality of texture images.

19. The image display system according to claim 16, wherein the mirroring image of a two-dimensional display mode is generated by pasting the portion of the one of the images to a panel corresponding to a screen size of the flat plate type display.

20. The image display system according to claim 16, wherein the circuitry of the image generation device is further configured to transmit, in synchronism with the mirroring image, metadata associated with the source image to the flat plate type display.

* * * * *